Nov. 7, 1967  R. P. HAWKINSON ETAL  3,351,117
AIR ATTACHMENT FOR BUFFING MACHINES AND THE LIKE
Filed June 13, 1966  2 Sheets-Sheet 1
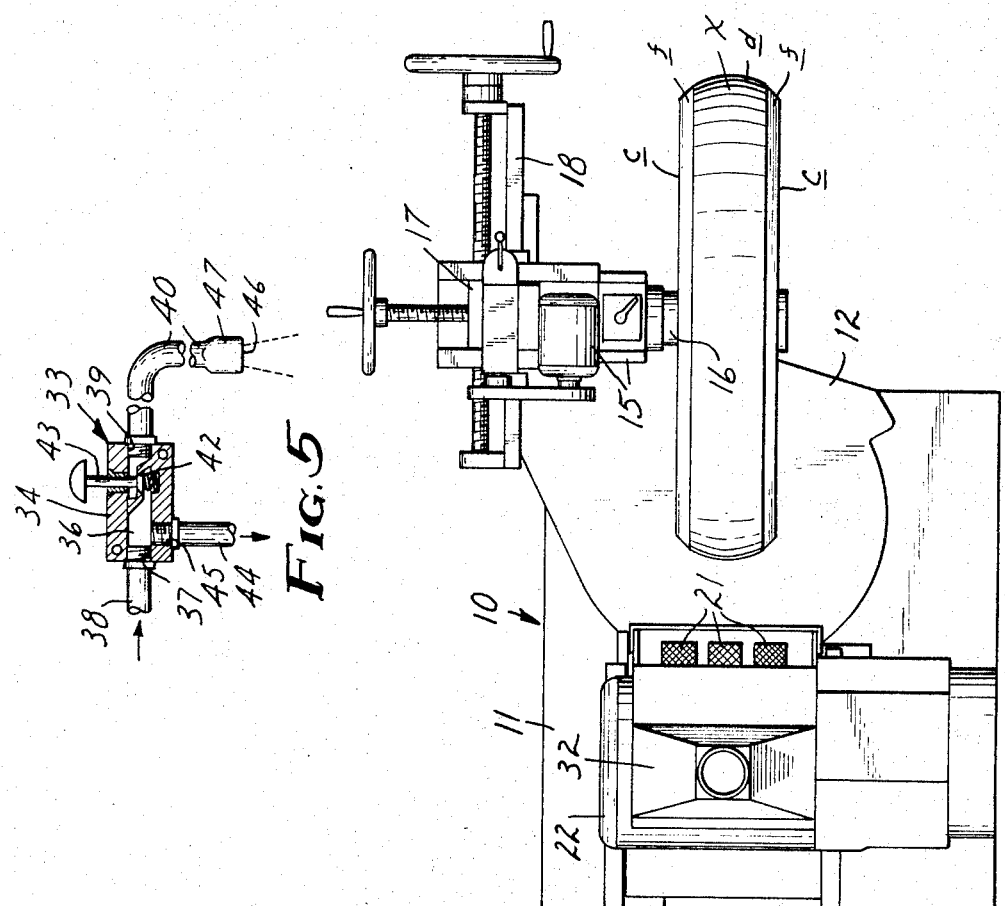
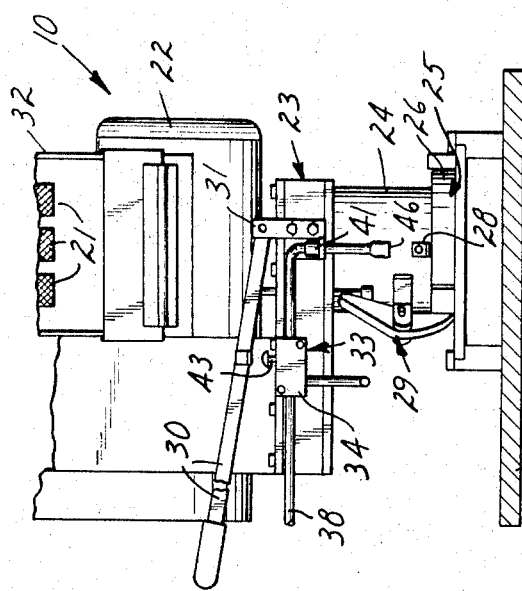
INVENTORS
RAYMOND P. HAWKINSON
RUDOLPH E. OLSON
BY Merchant & Gould
ATTORNEYS Nov. 7, 1967   R. P. HAWKINSON ETAL   3,351,117
AIR ATTACHMENT FOR BUFFING MACHINES AND THE LIKE
Filed June 13, 1966
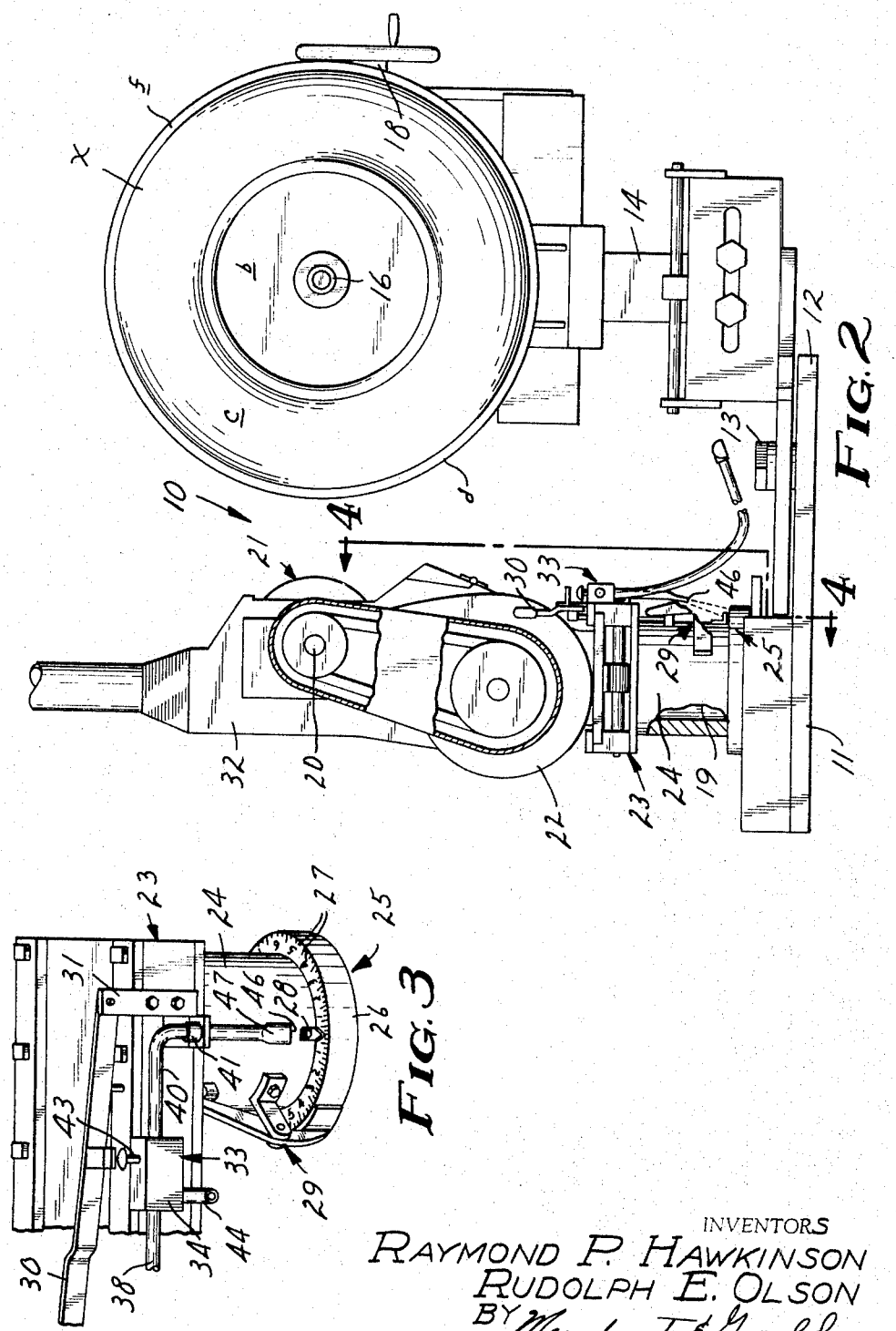
INVENTORS
RAYMOND P. HAWKINSON
RUDOLPH E. OLSON
BY Merchant & Gould
ATTORNEYS

United States Patent Office 3,351,117
Patented Nov. 7, 1967

3,351,117
AIR ATTACHMENT FOR BUFFING MACHINES AND THE LIKE
Raymond P. Hawkinson, Minneapolis, and Rudolph E. Olson, St. Louis Park, Minn., assignors to Paul E. Hawkinson Company, Minneapolis, Minn., a corporation of Minnesota
Filed June 13, 1966, Ser. No. 557,067
2 Claims. (Cl. 157—13)

Our invention relates generally to tire repair equipment and more specifically to improvements and/or modifications of tire buffing and truing machines such as those utilized in the tire recapping industry and disclosed in United States Patents 2,392,667 and 2,610,446.

Still more specifically our invention relates to tire buffing and truing machines having graduated indicating means for indicating the position of a buffing wheel relative to a tire carcass mounted thereon to be buffed and to means for maintaining such indicating means free of foreign material.

It is often desirable to adjust the buffing wheel of such a device in a manner to buff or true the shulders of the crown portion of such a tire either before or alternatively after the application of a strip of tread stock or camel back thereto. Obviously, some means such as the above mentioned indicating means must be provided to indicate the angle at which each of the shoulder portions are buffed so that each thereof are buffed and trued at an identical angle to provide a symmetrical appearance to the carcass.

In such buffing and truing machines means is provided for collecting the material buffed from the tire. In spite of the provision of such collecting means a certain amount of such material is not collected and is deposited generally on the base of the device. This material acts to obscure the above mentioned indicating means which may result in incorrect reading of the graduations during the above adjustments and subsequent damage to the tire carcass by incorrect buffing and truing. Also, such buffed material causes the need for repeated hand cleaning by an operator prior to adjustments of the buffing wheel which, consequently, is a great inconvenience, as well as time consuming.

It is therefore a primary object of our invention to provide means for automatically maintaining the above described indicating means free of foreign material during rotary adjustments of the buffing wheel relative to the tire carcass being worked upon.

It is another object of our invention to provide a device of the character above described which is extremely simple in construction, inexpensive to produce and trouble free in operation.

A further object of our invention is the provision of a device of the character above described which may be built into new machines and/or added to existing machines of the type above described with equal ease.

The above and still further objects of our invention will become apparent from the following detailed specification, appended claims and attached drawings.

Referring to the drawings wherein like characters indicate like parts throughout the several views:

FIG. 1 is a view in top plan of a tire buffing and truing machine constructed in accordance with our invention;

FIG. 2 is a view in side elevation thereof portions being broken away and shown in section;

FIG. 3 is a fragmentary view in prespective of a portion of FIG. 2, portions thereof being removed;

FIG. 4 is a view in vertical section as seen generally from the line 4—4 of FIG. 2; and FIG. 5 is a view partly in elevation and partly in axial section of a portion of FIG. 3.

Referring with greater particularity to the drawings, there is shown a tire buffing and truing machine indicated generally by the numeral 10. Buffing machine 10 is disclosed in detail in the above identified patents and therefore only a general description will be presented relative thereto. Buffing machine 10 includes a horizontally disposed base 11 to which is secured a turntable 12 for rotation on a vertical axis 13. Rigidly secured to the turntable 12, for swinging movements about the vertical axis 13 thereof, is a vertically disposed standard 14. A power head 15, having a horizontally disposed power output shaft 16, is operatively mounted to a slide element 17. Slide element 17 is mounted and guided, for movements axially to the power shaft 16, on a second slide element 18 which in turn is mounted and guided for movements normal to the axis of power shaft 16 on standard 14.

With this arrangement of parts, an inflated pneumatic tire carcass X mounted on a rim $b$ may be detachably mounted on the power output shaft 16 and adjusted to a desired position, by adjustment of the slide element 17 to a position wherein an extension of the vertical axis 13 will bisect a line centrally of the sidewalls $c$. Also, by adjustment of slide element 18, the shaft 16 may be adjusted in a direction normal to the axis thereof to dispose the crown portion $d$ of tire X in a required position relative to the axis 13.

Mounted and guided on the base 11 laterally of standard 14 for sliding movements toward and away from the pivot axis 13 of the turntable 12 is a second standard 19. Mounted on the standard 19 for rotation on a horizontal axis 20 is one or more tire tread buffing wheels identified collectively by the numeral 21. Buffing wheels 21 are driven by means of an electric motor 22 operatively connected thereto and carried by the second standard 19. It will be noted, by reference to FIGS. 1, 2 that one of the buffing wheels 21 is so disposed as to engage the peripheral surface or crown $d$ of the tire X upon slidable adjustments of the standard 19 on the base 11, as well as slidable adjustments of the slide elements 17, 18 with respect to the standard 14. It will also be noted that adjustment mechanism, indicated generally by the numeral 23, is provided for imparting adjustments to the buffing wheels 21 axially thereof to dispose a given one centrally relative to a center line bisecting the sidewalls $c$ of the tire X. Such an adjustment provides for equal buffing of the crown portion $d$ of tire X on opposite sides of such a center line by said given one of the buffing wheels 21 during pivotal movement of a tire X on the vertical axis 13 of turntable 12.

As seen particularly in FIG. 2, the buffing wheels 21, drive motor 22, and adjustment mechanism 23 are mounted for pivotal movements on the vertical axis of standard 19 by means of a sleeve 24 which is rigidly secured to mechanism 23 and telescopically receives standard 19. Such pivotal movements are provided to pivot the buffing wheels 21 to a desired position relative to tire X wherein the buffing surface of a given one of the buffing wheels 21 may be brought into buffing engagement with one of the shoulders $f$ thereof. Same may then be trued up after application of a strip of tread material or camel back to the crown $d$, or alternately the crown portion $d$ may be sized relative to the width of the tread material as required.

Indicating means for indicating the angular relationship of the buffing surface of the buffing wheels 21 with respect to the shoulders $f$ of tire X is indicated generally by the numeral 25, see FIG. 4, and includes an annular boss 26 formed at the base of standard 19 concentrically therewith. Boss 26 is provided with graduated indicia 27 on its upper surface. An indicator pointer 28 carried by the sleeve 24 in overlying relationship to the boss 26 registers with the indicia or graduations 27 to indicate the degree of pivotal movement to either side of a zero degree representation of graduations 27. A reading of zero degrees indicates the correct angular relationship of the buffing surface of buffing wheels 21 relative to the axis of tire X when it is desired to buff the crown portion d of tire X, while a reading to either side of zero would indicate the angular relationship of the buffing surface of a buffing wheel 21 relative to a given one of the shoulders f and crown d of tire X. Thus, each of the shoulders f may be buffed at equal angles relative to the axis of the tire X by use of the indicating device 25.

Brake mechanism indicated generally at 29 and including a horizontally disposed operating lever 30 is mounted on the sleeve 24 in a manner to engage the annular boss 26. Lever 30 is pivotally mounted on the adjustment mechanism 23, as at 31, and is operatively connected to the brake mechanism to release braking engagement thereof with the boss 26 upon downward movement of the outer end thereof when it is desired to impart a desired degree of pivotal movement to the buffing wheels on the axis of standard 19.

It will be noted, by reference to FIGS. 1, 2 that a shroud 32 partially encloses the buffing wheels 21 and is provided to collect and remove foreign material such as buffed rubber removed from the crown d and/or the shoulders f of tire X. In spite of the shroud 32 a certain amount of buffed rubber is deposited on the base 11 and consequently the graduations 27 on the indicating means 25 are often obscured. This results in the need for an operator to frequently hand clean the indicating means 25 so as to view the graduations 27 thereof prior to any pivotal adjustments of the buffing wheels on the axis of standard 19.

For the purpose of relieving an operator of such tasks, means indicated generally by the numeral 33 for automatically maintaining the graduations 27 free of buffed rubber material during adjustments of the buffing wheels 21 is provided. Means 33 includes a valve body 34 fixedly secured to the adjustment mechanism 23 in generally underlying relationship to the intermediate portion of the brake operating lever 30. Valve body 34 defines an air passage 36 therethrough and has an air inlet end 37 to which is connected a conduit 38 leading from a source of air under pressure, not shown. Connected to the outlet end 39 of passage 36 is a tubular conduit 40. Conduit 40 extends from the valve body 34 and terminates adjacent the indicator pointer 28. A bracket 41, carried by the adjustment mechanism 23, securely holds the conduit 40 in position. Valve means 42 interposed in the passage 36 between the inlet end 37 and outlet end 39 normally prevents the passage of air under pressure therethrough. A valve operating stem 43 extends vertically from the valve means 42 to a point wherein it is engageable by the brake operating lever 30 upon downward brake releasing movements thereof. An auxiliary air supply is provided by means of a valve equipped conduit 44 which is connected to a second air outlet 45 communicating with the passage 36 between the air inlet end 37 and valve means 42.

With the above arrangement of parts, it will be seen that no manual cleaning of the indicating means 25 is needed, for as an operator operates the lever 30 to release the brake 29 and thereafter imparts pivotal adjustments to the buffing wheels 21, to buff the shoulders f, lever 30 will move into engagement with valve operating stem 43 to release valve 42. Air under pressure will then be supplied to outlet end 46 of conduit 40 automatically during movement of the pointer 28 along the graduations 27. During such movement the pointer 28 and graduations 27 are maintained completely free of all buffed material resulting in the ability of an operator to make quick, accurate readings of the graduations 27. To assure that a jet of air is directed directly at and to either side of pointer 28, the outlet end 46 of conduit 44 is flattened, as at 47, to provide a fan-shaped jet of air. Should an operator feel the necessity of making a visual check of the indicating means 25, to ascertain if the brake 29 has slipped, he need only depress the valve stem 43 manually, without movement of the brake releasing lever 30, to clear any buffed rubber from the indicator means 25.

Our invention has been thoroughly tested and found to be completely satisfactory for the accomplishment of the above objects; and while we have shown and described above a preferred embodiment thereof in which the principles of the present invention have been incorporated, we wish it to be specifically understood that the same may be modified without departure from the scope and spirit of the appended claims.

What we claim is:

1. An improvement for tire buffing and truing machines having:
   (a) a horizontal base member,
   (b) a standard mounted on said base for swinging movements about a vertical axis,
   (c) a power head including a horizontal power output shaft,
   (d) means mounting said power head on said standard for horizontal movements in directions normal to and axially of said power output shaft,
   (e) means for mounting a rim equipped pneumatic tire casing on said shaft for common rotation therewith,
   (f) a second standard,
   (g) means mounting said second standard on said base laterally of said first mentioned standard for horizontal movements toward and away from the pivot axis of said first mentioned standard,
   (h) a power operated buffing wheel disposed for rotation on a horizontal axis,
   (i) means mounting said buffing wheel on said second standard for pivotal movements on the axis of said second standard and horizontal movements axially of said buffing wheel,
   (j) means including a horizontally disposed operating lever for locking said buffing wheel in a selected position of pivotal movement on the axis of said second standard,
   (k) means for indicating the degree of rotation of said buffing wheel relative to said second standard,
   (l) the improvement comprising:
      (1) a valve element having an air inlet for connection to a source of air supply under pressure, and an air outlet,
      (2) an air conduit having one end connected to said air outlet and the other end terminating adjacent said valve indicating means,
      (3) said valve element operable responsive to unlocking movements of said horizontally disposed operating lever to automatically direct a jet of air against said indicating means during said pivotal movements of said buffing wheel on the axis of said second standard.

2. The structure defined in claim 1 in which said other end of the tube is flattened whereby a fan-shaped jet of air is directed toward said indicating means.

References Cited

UNITED STATES PATENTS

| | | | |
|---|---|---|---|
| 2,392,667 | 1/1946 | Hawkinson | 157—13 XR |
| 2,864,445 | 12/1958 | Hawkinson | 157—13 |
| 2,888,065 | 5/1959 | Neilsen | 157—13 |

GRANVILLE Y. CUSTER, JR., *Primary Examiner.*